United States Patent [19]
Benjamin et al.

[11] Patent Number: 4,475,858
[45] Date of Patent: Oct. 9, 1984

[54] THREADED MEMBER HAVING RESILIENT INSERT

[75] Inventors: Benjamin C. Benjamin, Flint; Jack E. Cheney, Haslett, both of Mich.

[73] Assignee: Schmelzer Corporation, Flint, Mich.

[21] Appl. No.: 291,276

[22] Filed: Aug. 10, 1981

[51] Int. Cl.³ .................. F16B 39/34; F16B 39/24
[52] U.S. Cl. ........................ 411/304; 411/294; 411/299; 411/306; 10/10 P
[58] Field of Search ........ 411/294, 296, 299, 302–306, 411/334, 360; 10/10 P, 10 R

[56] References Cited

U.S. PATENT DOCUMENTS

| Re. 23,878 | 9/1954 | Burdick | 411/304 |
| 2,886,089 | 5/1959 | Schlage | 411/304 |
| 3,020,570 | 2/1962 | Wallace et al. | 411/302 |

FOREIGN PATENT DOCUMENTS

| 372405 | 5/1932 | United Kingdom | 411/304 |
| 1165316 | 9/1969 | United Kingdom | 411/304 |

Primary Examiner—Thomas J. Holko
Assistant Examiner—Neill Wilson
Attorney, Agent, or Firm—Fisher, Crampton, Groh & McGuire

[57] ABSTRACT

An adjustable threaded member for repeated adjustment to selected position in which a nylon insert acts against complementary threads to frictionally resist rotation of the threaded members. The nylon insert is in a recess, at least one outer end of which is enlarged to form spaces forwardly and rearwardly of the insert in the direction of rotation of the screw for the purpose of accumulating particles and a distorted portion of the nylon insert.

6 Claims, 10 Drawing Figures

THREADED MEMBER HAVING RESILIENT INSERT

This invention relates to adjustable screws whose position determines the operation of certain devices and which must be retained in the selected position of adjustment.

Various forms of lock devices have been provided for threaded members such as bolts, screws, nuts and the like and many of these use a resilient element coacting with mating threads of threaded members. Typically such arrangements are used for locking threaded devices in which the arrangement is rarely used more than one time. If it becomes necessary to loosen such cooperating and locked threaded members, it usually is necessary to substitute a new locking element. Such arrangements are completely unsatisfactory for screws which must be adjusted more than once and still be capable of retaining or locking the screw in the adjusted position. In the typical type of lock screw or lock and nut device, the torque required to place the threaded members into a locked condition in which it will be retained is of one value but with each successive loosening and tightening, the torque is reduced for a variety of reasons including wear of parts and permanent deformation or set in the locking member. Such reduction in adjusting torque is accompanied by a reduction in locking capability. The ideal locking device should maintain a uniform torque initially and for each successive relative movement of the threaded members that occurs with each adjustment.

In the automotive and other industries where parts are mass produced by the use of automated equipment, it is necessary to be able to predict the torque load because adjusting screws may be put in place by automated equipment and subsequently adjusted and readjusted manually or automatically. It is not uncommon for such manufacturers to specify the torque levels for such screws upon their initial insertion and some final adjustment, for example, the fifth adjustment.

Various factors affect the variation in torque loads between the first and final adjustment. For example, plating on mating parts may wear away or flake off to accumulate in the mating threads, dimensions of the mating parts may vary, or unbalanced or side loads may be imposed on mating parts.

It is an object of the invention to provide an adjusting screw in which the variations in torque between adjustments of threaded members is maintained at a minimum.

It is a further object of the invention to provide an adjusting screw employing a resilient insert acting between complementary threads in which dimensions are less critical than with conventional structures.

The objects of the invention are accomplished by an adjustable threaded member having a radially extending recess with an opening formed adjacent its threads. The recess contains a nylon insert which extends radially outwardly beyond the root of the threaded member and into an enlarged opening at the end of the recess. The outer end of the insert and the recess forms an annular space which affords the accumulation of particles to one side of the insert and a distorted portion of the outer end of the insert at a diametrically opposed space all to minimize frictional loading and torque on the screw during repeated adjustments and readjustments. In a second embodiment the insert is free to slide transversly and engages diametrically opposed points on complementary threads to prevent unbalanced loads and to maintain substantially uniform loading during repeated adjustments.

Preferred embodiments of the invention are illustrated in the accompanying drawings in which.

Figure 1:
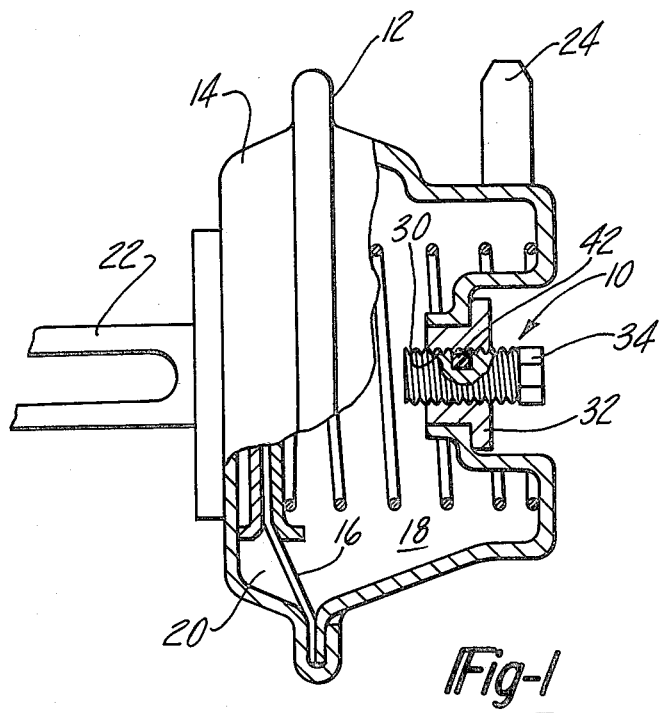
FIG. 1 is a view of a servo motor partly in cross section and with parts broken away incorporating an adjusting screw embodying the invention.

Referring to the drawings the adjusting screw 10 embodying the invention can be used in a variety of screw adjusting environments and in FIG. 1 is shown in use with a vacuum servo motor 12 having a housing 14 divided by a diaphragm assembly 16 into a vacuum chamber 18 and an atmospheric pressure chamber 20. The diaphragm assembly 16 is connected to a stem 22 which may be connected to a variety of instrumentalities such as carburetor controls for example. Upon admission of vacuum through the inlet 24 to the vacuum chamber 18, a pressure differential is created causing the diaphragm assembly 16 to move to the right together with the stem 22. The stroke of such movement can be regulated by positioning the adjusting screw 10 axially of its length to selected positions at which it will be held until readjusted.

The adjusting screw 10 has a cylindrical body member 26 and external threads 28 which are complementary to threads 30 in a wall element 32 formed in the wall of housing 14. The screw 10 has a head 34 to receive a tool by which the adjusting screw 10 can be rotated relative to the wall element 32 to selected positions.

Figure 2:
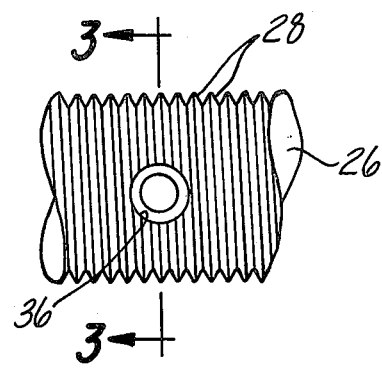
FIG. 2 is a plan view at an enlarged scale of a portion of the adjusting screw used in FIG. 1.
Figure 3:
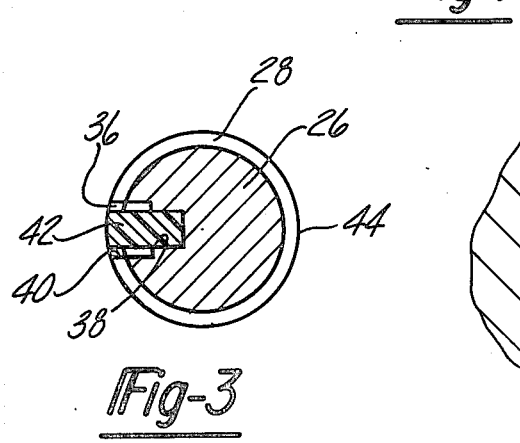
FIG. 3 is a cross sectional view taken on line 3—3 in FIG. 2.

Referring now to FIGS. 2 and 3 the adjusting screw 10 is provided with a radially extending recess 36. The recess 36 is in the form of a stepped blind bore the smaller portion 38 of the recess 36 being formed radially inwardly of the body member 26 and the larger portion 40 being formed radially outwardly of the body member 26 and in the threads 28 of the screw 10. The large bore 40 extends below the root of the threads 28 and provides an opening at the radial outer end of the recess 36. A pellet or insert 42 preferably made of nylon or similar plastic material has a generally cylindrical shape and a diameter conforming to that of the small bore 38. The pellet 42 is disposed in the bore 38 and protrudes beyond the root of the threads 28 and to an extent equal to the outside diameter of the threads 28. This forms an annular space in the opening 40 around the radial outer end of the pellet 42.

Figure 4:
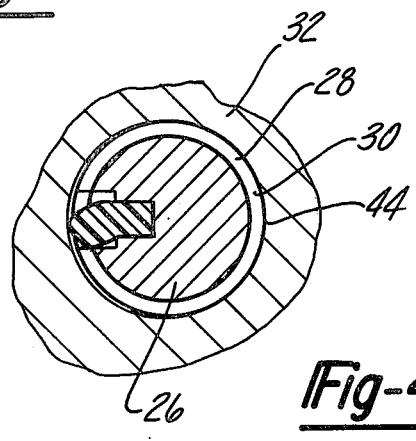
FIG. 4 is a view similar to FIG. 3 but slightly exaggerating the portion of the adjusting screw relative to complementary threads.

With the adjusting screw 10 in position with its threads 28 in engagement with complementary threads 20, the pellet 42 serves to engage the wall threads 30 and applies the radial force on the threads 30 which acts to force the diametrically opposite portion of the threads 28 at a point 44 against the adjacent portion of the wall threads 30 as best visualized from an examination of FIG. 4. At the same time the tips of threads 28 adjacent the pellet 42 tend to be slightly spaced or in light engagement with the roots of threads 20 as exaggerated in FIG. 4 for the purpose of illustration.

As the adjusting screw 10 is adjusted, for example, in a clockwise direction as viewed in FIG. 4, the space in the annular opening 40 rearwardly of the pellet 42 receives the distorted or deformed outer portion of the pellet 42. The space in the opening 40 forward of the pellet 42 in the direction of rotation will accumulate foreign particles which otherwise would become lodged between the complementary threads 28 and 30 and affect the holding torque of the screw. Upon reversal of rotation of the screw 10 the outer end of the pellet 42 can flex in the opposite direction and the diametrically opposed space can serve to accumulate particles. In prior art devices, in which the nylon pellet occupies the entire space in the hole in the screw, the clearance between the complementary threads must accomodate foreign materials such as dirt and flakes of plating material. Also, in the prior art devices, the radial dimension of the insert or pellet is critical, making it necessary to very accurately control the pellet dimensions as well as the clearance and accuracy of the mating screw threads. This is particularly difficult with very small screws. In the present arrangement of the pellet the accuracy of the clearance between complementary threads 28 and 30 is less critical.

The pellet 42 exerts friction against threads 30 and tends to force the diametrically opposed threads 28 and 30 into tight engagement which prevents screw rotation except with a use of a tool.

Figure 5:
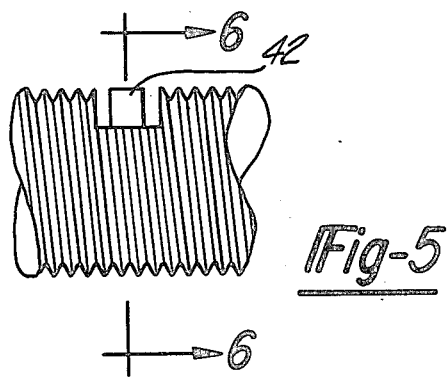
FIG. 5 is a view similar to FIG. 2 of another embodiment of the invention.
Figure 6:
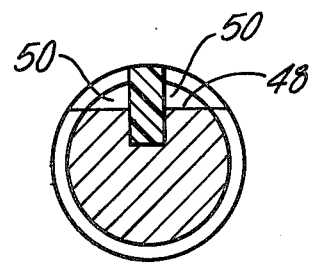
FIG. 6 is a cross sectional view taken on line 6—6 in FIG. 5.

Referring now to FIGS. 5 and 6 another embodiment of the adjusting screw 10 provides the space adjacent to the pellet 42 by removing a segment of material from the adjusting screw 10 to form a flat surface 48. The flat surface 48 affords spaces 50 at opposite sides of the pellet 42 in a direction circumferentially of the adjusting screw 10, that is, forwardly and rearwardly of the direction of rotation. Depending upon the direction of rotation, the spaces 50 accept the deformed radially outer portion of the insert 42 and receive particles of foreign material. As with the embodiment described in connection with FIGS. 2 through 4, the nylon insert provides a frictional force which resists rotation of the adjusting screw 10 from its selected position and accomplishes its holding ability after repeated adjustments.

Figure 7:
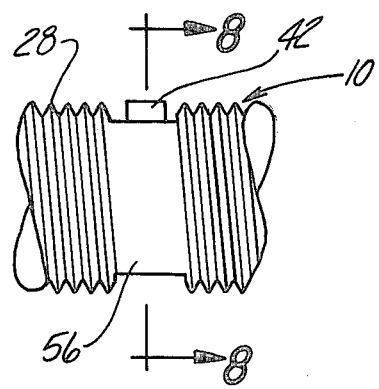
FIG. 7 is a view similar to FIG. 5 showing still another embodiment of the invention.
Figure 8:
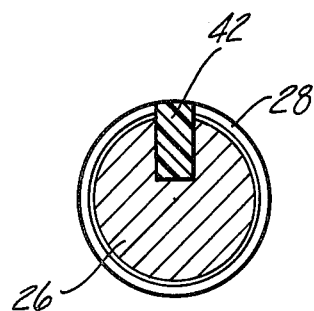
FIG. 8 is a cross sectional view taken on line 8—8 of FIG. 7.

Referring to FIGS. 7 and 8 another embodiment of the adjusting screw 10 is shown in which an annular groove 56 is formed in the adjusting screw 10. As in the prior embodiments the groove 56 serves to form a space forwardly and rearwardly of the pellet relative to the direction of rotation to accumulate foreign particles and to accept the deformed portion of the pellet 42 all for the purpose of making a uniform torque during repeated adjustments of the screw 10.

Figure 9:
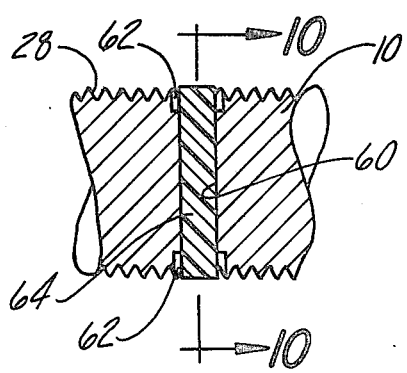
FIG. 9 is a cross sectional view of a portion of an adjusting screw showing another embodiment of the invention.
Figure 10:
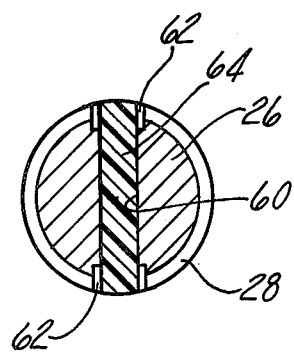
FIG. 10 is a cross sectional view taken on line 10—10 in FIG. 9.

Another embodiment of the invention is shown in FIGS. 9 and 10 in which the adjusting screw 10 is provided with an opening or recess 60 which extends diametrically through the body member 26 and threads 28. The opposite outer ends of the recess 60 are provided with enlarged portions 62 which extends not only through the threads 28 but also through the body member 26 in the same manner as the opening 40 in the embodiment of FIGS. 2 through 4. The recess 60 receives an insert of pellet 64 having a length substantially equal to the outside diameter of the adjusting screw 10. The pellet 64 has a diameter slightly less than the diameter of the recess 60 so that it can move transversly of the axis of the adjusting screw 10. In an adjusting position, with complementary threads 28 and 30 in engagement with each other, opposite ends of the pellet 64 exert an opposite and equal force on the threads 30 in which the adjusting screw 10 is seated. The pellet 64 serves to frictionally resist movement of the adjusting screw from its selected position and makes it possible for the adjusting screw to be rotated to such selected positions without the imposition of unbalanced radial loads to one side of the adjusting screw. The annular recess formed around the radial outer ends of the pellet 64 operate in the same manner as the insert 42 in the opening 40 in FIGS. 2 through 4, that is, for the purpose of accepting the deformed end portions of the pellet 64 and to accumulate any foreign particles that may be encountered all for the purpose of maintaining a uniform load during repeated adjustments of the screw 10 to selected axial positions in opposite directions.

The embodiments of the invention in which an exclusive property or privilege is claimed are defined as follows:

1. An adjustable threaded member for threaded cooperation with complementary threads, said threaded member having a body with external threads engageable with said complementary threads, said threaded member having a single radially extending recess forming an opening adjacent its threads, an elongated nylon insert in said recess extending radially beyond the root of said threaded member for frictional engagement with said complementary threads to hold said complementary threads relative to each other to prevent rotation in either direction, said opening of said recess being larger than said insert to form a space extending below the root of said external threads at opposite sides and adjacent to said insert in a direction circumferentially of said body member, said opening being operative to receive particles of material at said opposite sides forward of the direction of rotation of said threaded member and to accept a distorted portion of said insert at the other side of said opposite sides rearwardly of the direction of rotation of said threaded member upon rotation of said threaded member relative to said complementary threads in either direction, said recess being formed by a stepped bore, the smaller portion of which receives said insert and the larger portion of which forms said opening.

2. An adjustable threaded member for threaded cooperation with complementary threads, said threaded member having a body with external threads engageable with said complementary threads, said threaded member having a radially extending recess forming an opening adjacent its threads, a nylon insert in said recess extending radially beyond the root of said threaded member for frictional engagement with said complementary threads to hold said complementary threads in non-rotatable relation, said opening of said recess being larger than said insert to form a space extending below the root of said external threads at opposite sides and adjacent to said insert in a direction circumferentially of said body member, said opening being operative to receive particles of material at one of said opposite sides and to accept a distorted portion of said insert at the other of said opposite sides upon rotation of said threaded member relative to said complementary threads, said space at opposite sides of said insert being formed by a flat portion extending tangentially and below the surface of said cylindrical body.

3. The adjustable threaded member of claim 2 wherein said recess extends diametrically through said screw.

4. An adjustable threaded member for threaded cooperation with complementary threads, said threaded member having a body with external threads engageable with said complementary threads, said threaded member having a recess extending diametrically therethrough, an opening being formed at both ends of said recess, a nylon insert in said recess extending radially beyond the root of said threaded member for frictional engagement with said complementary threads to hold said complementary threads in non-rotatable relation, said openings of said recess being larger than said insert to form a space extending below the root of said external threads at opposite sides and adjacent to said insert in a direction circumferentially of said body member, said openings being operative to receive particles of material at one of said opposite sides and to accept a distorted portion of said insert at the other of said opposite sides upon rotation of said threaded member relative to said complementary threads.

5. The adjustable threaded member of claim 4 wherein said nylon insert extends through said recess beyond the root of said threaded member, said insert being movable in said recess to exert equal forces in opposite directions.

6. An adjustable threaded member for threaded cooperation with complementary threads, said threaded member having a body with external threads engageable with said complementary threads, said threaded member having a single radially extending recess forming an opeing adjacent its threads, an elongated nylon insert in said recess extending radially beyond the root of said threaded member for frictional engagement with said complementary threads to hold said complementary threads relative to each other to prevent rotation in either direction, said opening of said recess being larger than said insert to form a space extending below the root of said external threads at opposite sides and adjacent to said insert in a direction circumferentially of said body member, said opening being operative to receive particles of material at one of said opposite sides forward of the direction of rotation of said threaded member and to accept a distorted portion of said insert at the other of said opposite sides rearwardly of the direction of rotation of said threaded member upon rotation of said threaded member relative to said complementary threads in either direction, said recess extending diametrically through said screw and said space being formed by a flat portion formed tangentially and below the root of said screw.

* * * * *

UNITED STATES PATENT AND TRADEMARK OFFICE
CERTIFICATE OF CORRECTION

PATENT NO. : 4,475,858
DATED : October 9, 1984
INVENTOR(S) : Benjamin C. Benjamin and Jack E. Cheney It is certified that error appears in the above-identified patent and that said Letters Patent is hereby corrected as shown below:

Column 1, line 67, delete "transversly" and insert --transversely--

Column 2, line 43, delete "axailly" and insert --axially--

Column 3, line 26, delete "accomodate" and insert --accommodate--

Column 4, line 8, delete "transversly" and insert -transversely-

Column 4, line 48, delete "side" after the word --other--

Signed and Sealed this

Fourteenth Day of May 1985

[SEAL]

Attest:

DONALD J. QUIGG

Attesting Officer

Acting Commissioner of Patents and Trademarks